United States Patent
Schnädelbach

(10) Patent No.: US 11,802,612 B2
(45) Date of Patent: Oct. 31, 2023

(54) HYDRODYNAMIC TORQUE CONVERTER AND TORSIONAL VIBRATION DAMPER FOR SAME

(71) Applicant: Schaeffler Technologies AG & Co. KG, Herzogenaurach (DE)

(72) Inventor: David Schnädelbach, Ottersweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 96 days.

(21) Appl. No.: 17/442,861

(22) PCT Filed: Mar. 12, 2020

(86) PCT No.: PCT/DE2020/100182
§ 371 (c)(1),
(2) Date: Sep. 24, 2021

(87) PCT Pub. No.: WO2020/200359
PCT Pub. Date: Oct. 8, 2020

(65) Prior Publication Data
US 2022/0178431 A1  Jun. 9, 2022

(30) Foreign Application Priority Data
Apr. 5, 2019 (DE) .......................... 102019109015.6

(51) Int. Cl.
*F16H 45/02* (2006.01)
*F16F 15/123* (2006.01)
*F16F 15/14* (2006.01)

(52) U.S. Cl.
CPC ....... *F16H 45/02* (2013.01); *F16F 15/12373* (2013.01); *F16F 15/145* (2013.01);
(Continued)

(58) Field of Classification Search
CPC ............ F16H 45/02; F16H 2045/0226; F16H 2045/0263; F16H 2045/0231;
(Continued)

(56) References Cited

U.S. PATENT DOCUMENTS

| 8,161,740 B2 * | 4/2012 | Krause ................. | F16F 15/145 60/338 |
| 8,479,901 B2 * | 7/2013 | Engelmann ........... | F16F 15/145 60/338 |

(Continued)

FOREIGN PATENT DOCUMENTS

| CN | 101883933 A | 11/2010 |
| CN | 104641144 A | 5/2015 |

(Continued)

*Primary Examiner* — Jacob S. Scott
*Assistant Examiner* — Farhana Pervin

(57) ABSTRACT

A hydrodynamic torque converter and a torsional vibration damper include a pump wheel connected on the drive side and a turbine wheel which is driven by the pump wheel. Between the housing of the torque converter and an output hub, a torsional vibration damper, which includes an input part that can be connected to the housing by a converter bridging clutch, and an output part, which is connected to the output hub, are provided. In order to allow a special wiring of the torsional vibration damper, an intermediate flange is arranged against a respective spring device, which acts in a circumferential direction, between the input part and the output part, said intermediate flange having a centrifugal pendulum and being connected to the turbine wheel.

20 Claims, 5 Drawing Sheets

(52) U.S. Cl.
CPC ....... *F16F 2222/08* (2013.01); *F16F 2232/02* (2013.01); *F16F 2236/08* (2013.01); *F16H 2045/0226* (2013.01); *F16H 2045/0263* (2013.01)

(58) Field of Classification Search
CPC ........ F16H 2045/0247; F16F 15/12373; F16F 15/145; F16F 2222/08; F16F 2232/02; F16F 2236/08; F16F 15/123
See application file for complete search history.

(56) References Cited

U.S. PATENT DOCUMENTS

| | | | |
|---|---|---|---|
| 9,115,765 B2* | 8/2015 | Mahe | F16H 45/02 |
| 9,518,631 B2* | 12/2016 | Miyahara | F16F 15/145 |
| 2010/0269497 A1* | 10/2010 | Engelmann | F16F 15/145 |
| | | | 60/338 |
| 2011/0099992 A1 | 5/2011 | Magerkurth et al. | |
| 2011/0287844 A1 | 11/2011 | Steinberger | |
| 2014/0044523 A1* | 2/2014 | Voegtle | F16H 45/00 |
| | | | 415/104 |
| 2016/0010697 A1* | 1/2016 | Hennebelle | F16H 45/02 |
| | | | 464/68.8 |
| 2016/0069417 A1* | 3/2016 | Mahe | F16F 15/145 |
| | | | 464/68.92 |
| 2016/0160975 A1* | 6/2016 | Depraete | F16H 45/02 |
| | | | 192/3.29 |
| 2019/0195313 A1* | 6/2019 | Yoshikawa | F16F 15/31 |

FOREIGN PATENT DOCUMENTS

| | | |
|---|---|---|
| CN | 207598797 U | 7/2018 |
| DE | 102008057648 A1 | 6/2009 |
| DE | 102009024743 A1 | 1/2010 |
| DE | 102010014674 A1 | 11/2010 |
| DE | 102011087879 A1 | 6/2012 |
| DE | 102011089250 A1 | 7/2012 |
| DE | 102013212282 A1 | 1/2014 |
| WO | 2010000220 A1 | 1/2010 |
| WO | 2011110146 A1 | 9/2011 |

* cited by examiner

HYDRODYNAMIC TORQUE CONVERTER AND TORSIONAL VIBRATION DAMPER FOR SAME

CROSS-REFERENCE TO RELATED APPLICATIONS

This application is the U.S. National Phase of PCT Appln. No. PCT/DE2020/100182 filed Mar. 12, 2020, which claims priority to DE 102019109015.6 filed Apr. 5, 2019, the entire disclosures of which are incorporated by reference herein.

TECHNICAL FIELD

The disclosure relates to a hydrodynamic torque converter and a torsional vibration damper for same, comprising a pump wheel connected on the drive side and a turbine wheel which is driven by the pump wheel, wherein between the housing of the torque converter and an output hub, a torsional vibration damper, which comprises an input part that can be connected to the housing by means of a converter bridging clutch, and an output part, which is connected to the output hub, are provided.

BACKGROUND

Hydrodynamic torque converters are used in drive trains of motor vehicles to transmit torque while adapting the different speeds between a crankshaft of an internal combustion engine and a transmission input shaft of a transmission. For this purpose, the crankshaft drives a housing of the torque converter with a pump wheel, which hydrodynamically drives a turbine wheel. An idler wheel can also be provided to increase torque at low speeds. In order to prevent the torque converter from slipping at higher speeds, a so-called converter bridging clutch can be provided between the housing and an output hub of the torque converter. Torsional vibration dampers can be provided between the converter bridging clutch and the output hub and/or between the turbine wheel and the output hub.

The document DE 10 2010 014 674 A1 shows, for example, a hydrodynamic torque converter with a torsional vibration damper arranged within its housing. The torsional vibration damper has an input part which is connected to a turbine wheel and a converter bridging clutch, an output part which is connected to an output hub and an intermediate flange connected in series between these by means of spring devices. The intermediate flange carries a centrifugal pendulum.

SUMMARY

The object of the disclosure is to develop a generic hydrodynamic torque converter and a torsional vibration damper for same. In particular, the object of the disclosure is to enable an alternative wiring of the torsional vibration damper.

The object is achieved by the subject matter described herein.

The proposed hydrodynamic torque converter is used, in particular, in a drive train of a motor vehicle to transmit torque from a crankshaft of an internal combustion engine to a transmission input shaft of a transmission while adjusting possibly different speeds and to increase torque during a start-up phase of the motor vehicle. For this purpose, the torque converter contains a housing with which a pump wheel is integrated in a non-rotatable manner or can be connected by means of a separate clutch. The pump wheel hydrodynamically drives a turbine wheel. The torque introduced into the torque converter is converted via an output hub that can be or is connected to the turbine wheel, for example transferred to a transmission input shaft of a transmission, for example a multi-stage automatic transmission, in an excessive manner by means of an idler wheel.

To bypass the torque converter, for example after a completed start-up process, a converter bridging clutch integrated into the housing can be provided between the housing and the output hub. A first torsional vibration damping device is provided between the output part of the converter bridging clutch and the output hub. The turbine wheel is rotatably received on the output hub against the action of a second torsional vibration device, a so-called turbine damper.

The two torsional vibration damping devices are provided by means of a single torsional vibration damper. Here, the input part of the torsional vibration damper is connected to the output of the converter bridging clutch and the output part is connected to the output hub. The torsional vibration damper has an intermediate flange which is effectively arranged between the input part and the output part by means of a spring device which acts in the circumferential direction.

To connect the turbine wheel to the torsional vibration damper, this is connected to the intermediate flange in a non-rotatable manner, for example riveted and centered on the output hub. To improve the torsional vibration isolation of the torsional vibration damper when the converter bridging clutch is open and closed, a centrifugal pendulum is received on the intermediate flange. The centrifugal pendulum can be matched to a single damper order due to the similar design of all pendulum masses and their pendulum bearings with predetermined pendulum tracks opposite the intermediate flange. Alternatively, two damper arrangements can be provided which are matched to the oscillation modes of the open and closed converter bridging clutch and/or to a different number of cylinders operated by the internal combustion engine. Here, for example, two sets of pendulum masses with different masses and/or different pendulum tracks provided between pendulum mass carriers and pendulum masses can be provided by means of a corresponding design of the raceways of the pendulum bearings. When the converter bridging clutch is closed, the turbine mass can serve as an additional damper mass for the intermediate flange.

The spring devices can each be formed from linearly designed helical compression springs distributed over the circumference. The helical compression springs can each be housed individually securely on a circumference. Alternatively, so-called helical compression spring assemblies can be provided in which a plurality of helical compression springs are nested inside one another. The helical compression springs of a helical compression spring assembly can have different lengths for setting a multi-stage characteristic curve of the torsional force over the angle of rotation of the torsional vibration damper. Different helical compression springs and/or different helical compression spring assemblies can be arranged in the different circumferential directions in relation to the intermediate flange. The helical compression springs can be arranged on different diameters. Preferably, the helical compression springs of the two spring devices are arranged on the same diameter and alternately over the circumference. The same diameter also means differences in the diameters of the pitch circles of the helical compression springs, as long as these diameters are arranged within the radial extent of all helical compression springs.

According to an advantageous embodiment of the torsional vibration damper, the intermediate flange is formed from two interconnected lateral parts which are axially spaced, which receive the input part and the output part therebetween. The two lateral parts serve as pendulum mass carriers for the pendulum masses distributed over the circumference, for example in an order of two to four. The pendulum masses, for example made of a plurality of sheet metal parts, are arranged axially between the lateral parts. Lateral parts and pendulum masses have axially aligned recesses with raceways, on which a pendulum roller axially overlapping the recess rolls.

The input part and the output part can be designed as disc parts formed axially next to one another. A lateral part facing the converter bridging clutch can be shortened radially on the inside so that a connection such as riveting can be formed between the output part of the converter bridging clutch and the input part of the torsional vibration damper. The input part can be centered on the output hub and the output part can be connected to the output hub in a non-rotatable manner. For example, the output part and the output hub can be designed in one piece, riveted to one another or connected to one another in a non-rotatable manner and with axial play by means of internal and external toothing.

In an advantageous manner, the disc parts can have loading regions arranged in one plane for the end faces of the helical compression springs. For this purpose, parts of the disc parts can be designed to be overlapping axially and radially one above the other, so that the helical compression springs are each loaded axially centrally by the input part or the output part with respect to their cross section. The end faces of the respective helical compression springs that lie opposite the loading regions of the input part or the output part in the circumferential direction are loaded by the lateral parts. For this purpose, axially aligned spring windows are provided in the lateral parts of the intermediate flange, into which the helical compression springs or helical compression spring assemblies are inserted captively and supported radially against centrifugal force. The radial walls of the spring windows serve as loading regions of the intermediate flange.

The loading regions of the input part and/or the output part can be planar or have noses that extend in the circumferential direction and engage in the interior of at least one part of the helical compression springs. The noses can be designed in such a way that the helical compression spring ends are pulled radially inward during loading and therefore friction between them is prevented or at least reduced radially on the outside.

The disc parts preferably have, when the torsional vibration damper is not loaded, axially aligned with the spring windows, radially outwardly open recesses for the helical compression springs, with a support that extends over the helical compression spring in the circumferential direction on the radial outside on at least one disc part.

The object is also achieved by a torsional vibration damper, in particular for a hydrodynamic torque converter having the features listed above with an input part and an output part and an intermediate flange, wherein the input part, intermediate flange and output part are arranged in series by means of helical compression springs acting in the circumferential direction and the input part and the output part are designed as axially adjacent disc parts, which are arranged between two axially spaced and interconnected lateral parts of the intermediate flange.

BRIEF DESCRIPTION OF THE DRAWINGS

The disclosure is explained in more detail with reference to the exemplary embodiments shown in FIGS. 1 to 10. In the figures.

DETAILED DESCRIPTION

Figure 1:
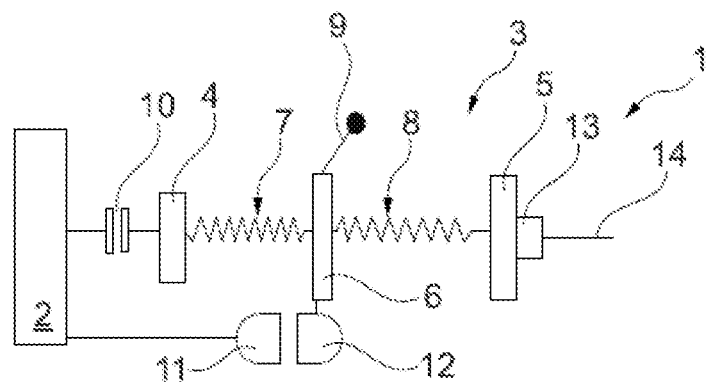
FIG. 1 shows a schematic representation of a hydrodynamic torque converter having a torsional vibration damper.

FIG. 1 shows a schematic view of the hydrodynamic torque converter 1 with the torsional vibration damper 3 integrated in its housing 2. The torsional vibration damper 3 contains the input part 4, the output part 5 and the intermediate flange 6. The intermediate flange 6 is elastically coupled to the input part 4 and the output part 5 by means of the spring devices 7, 8 and carries the centrifugal pendulum 9.

The converter bridging clutch 10 is arranged between the housing 2 and the input part 4 of the torsional vibration damper 3. The pump wheel 11 is connected to the housing 2. When the converter bridging clutch 10 is open, the pump wheel 11 drives the turbine wheel 12. Between the pump wheel 11 and the turbine wheel 12, an idler wheel (not shown) is effectively arranged to increase the torque during a start-up process. The turbine wheel 12 is connected to the intermediate flange 6 so that the torsional vibration damper 3 has two different inputs, the torque of which is transmitted via the output part 5 to the output hub 13 and the transmission input shaft 14 of a transmission connected thereto.

The torsional vibration damper 3 therefore acts as a so-called lock-up damper when the converter bridging clutch 10 is closed, with the speed-adaptive centrifugal pendulum 9 and the turbine wheel 12 suspended as inertial mass on the intermediate flange 6 as damper components. In converter operation with the converter bridging clutch 10 open, the torsional vibration damper 3 acts as a turbine damper between the intermediate flange 6 connected to the turbine wheel 12 and the output hub 13.

The spring devices 7, 8 are preferably formed from linear helical compression springs or helical compression spring assemblies with nested linear helical compression springs arranged over the circumference.

Figure 2:
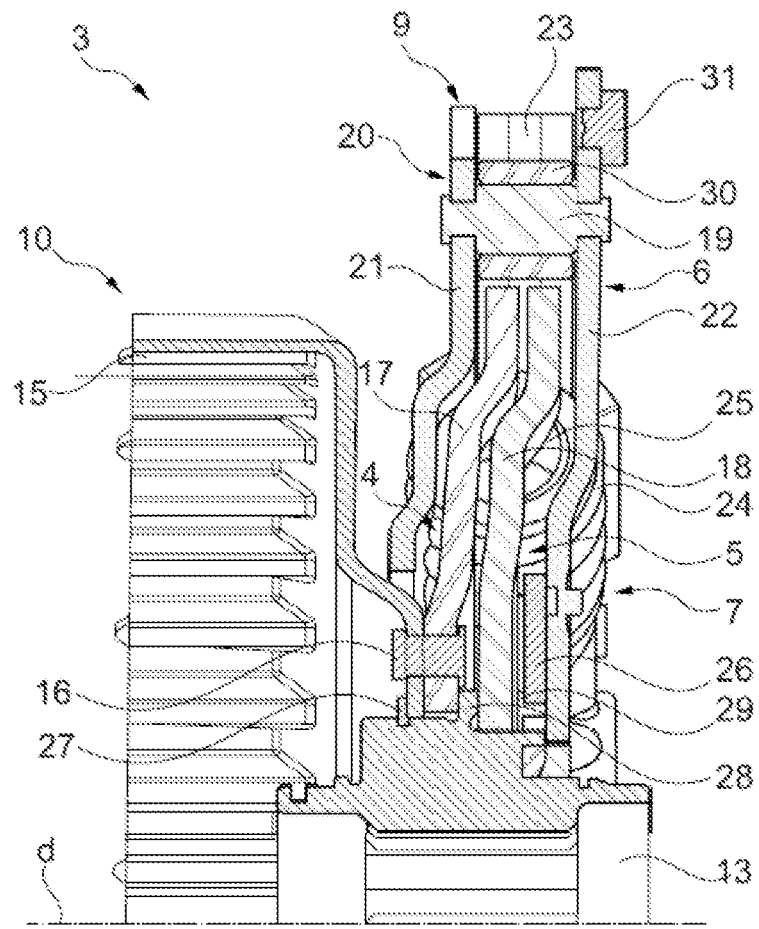
FIG. 2 shows the upper part of a structurally designed embodiment of the torsional vibration damper of FIG. 1 along a first section line.

FIG. 2 shows the upper part of the structurally designed torsional vibration damper 3, which can be rotated about the rotational axis d, in section. The input part 4 is connected to the output-side plate carrier 15 of the converter bridging clutch 10 by means of the rivets 16 distributed over the circumference. The input part 4 is received in a rotatable centered manner on the output hub 13. The output part 5 is connected to the output hub 13 in a non-rotatable manner. The input part 4 and output part 5 are designed as disc parts 17, 18 arranged parallel to one another. The disc part 17 is axially fixed and rotatably received by means of the securing ring 27 and the annular rim 28 of the output hub 13 and is centered on the output hub 13. The disc part 18 is axially fixed between the annular rim 28 and the securing ring 29 and is held in a non-rotatable manner on the output hub 13 by means of toothing (not shown).

The intermediate flange 6 is formed from the two axially spaced lateral parts 21, 22 which are interconnected by means of the spacer bolts 19. The disc parts 17, 18 are axially received between the lateral parts 21, 22 of the intermediate flange 6. The lateral part 21 facing the converter bridging clutch 10 is recessed radially on the inside in order to enable the connection of the disc carrier 15 to the input part 4.

The lateral parts 21, 22 form the pendulum mass carrier 20 of the centrifugal pendulum 9 and receive, between them, the pendulum masses 23, which are formed, for example, from riveted sheet metal discs that are distributed over the circumference. The pendulum masses 23 are suspended in the centrifugal force field of the torsional vibration damper 3 rotating about the rotational axis d by means of pendulum bearings (not shown) on the pendulum mass carrier 20 along a predetermined pendulum track. The spacer bolts 19 have stop buffers 30 to delimit the oscillation angle of the pendulum masses 23.

Spring devices 7, 8 (FIG. 1) act between the input part 4, the intermediate flange 6 and the output part 5, of which spring devices only the spring device 7 is shown in FIG. 2. The spring devices 7, 8 are arranged in series, that is, when the input part 4 is rotated relative to the output part 5 about the rotational axis d, depending on the direction of the applied torque, the spring devices between the input part 4 and the intermediate flange 6 and the spring devices 7, 8 arranged to act between the intermediate flange 6 and the output part 5 are loaded in series.

The spring device 7 is formed from linear, nested helical compression springs 24, 25 which are arranged distributed over the circumference.

The thrust washer 26, made in particular of plastic and suspended in a non-rotatable manner in the lateral part 22, delimits the axial play of the intermediate flange 6. The intermediate flange 6 is rotatably received and centered on the output hub 13 by means of the lateral part 22. The intermediate flange 6 is balanced by means of the balancing weights 31.

Figure 3:
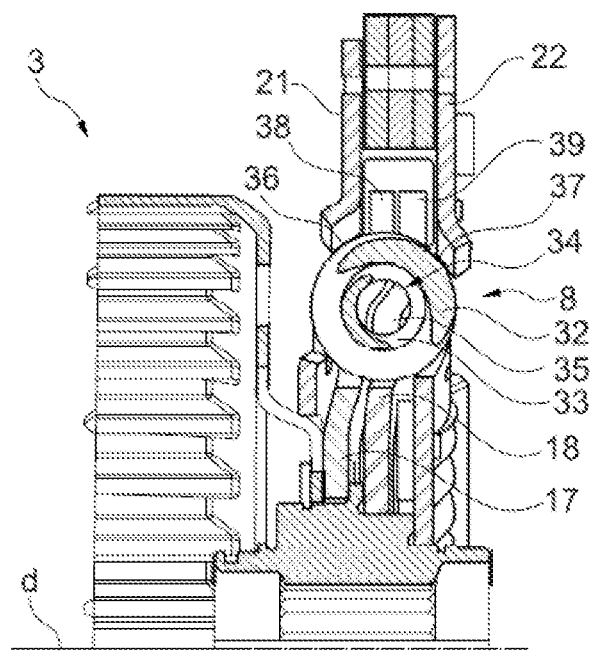
FIG. 3 shows the upper part of the torsional vibration damper from FIG. 2 along a modified section line.

FIG. 3 shows the upper part of the torsional vibration damper 3 of FIG. 2, which is arranged so as to be rotatable about the rotational axis d, along a modified section line through the helical compression springs 32, 33 of the spring device 8. The loading of the helical compression springs 32, 33 becomes clear from FIG. 3. For the maximum overlapping loading of the helical compression springs 32, 33 by means of the disc parts 17, 18, these are cranked. In the illustration shown, the loading region 34 of the disc part 18 is formed axially centrally in the cross section of the helical compression springs 32, 33. The nose 35 extending in the circumferential direction into the interior of the inner helical compression spring 33 stabilizes the position of the helical compression springs 32, 33. The loading of the helical compression springs 32, 33 occurs on this end face on the output side. Correspondingly, the disc part 17 is provided on the other end face of the helical compression springs 32, 33 for loading on the input side with a loading region provided with a nose, which loading region is formed in the center of the cross section of the helical compression springs 32, 33.

The helical compression springs 32, 33 are received in spring windows 36, 37 of the lateral parts 21, 22 that are axially projected radially on the outside. In this case, the helical compression springs 32, 33 are loaded by radial walls of the spring windows 36, 37.

To reduce the radial friction of the outer helical compression springs 32, the supports 38, 39 are arranged on the disc parts 17, 18, widened in the circumferential direction and radially support at least the end turns of the helical compression springs 32, 33 on the two end faces.

Figure 4:
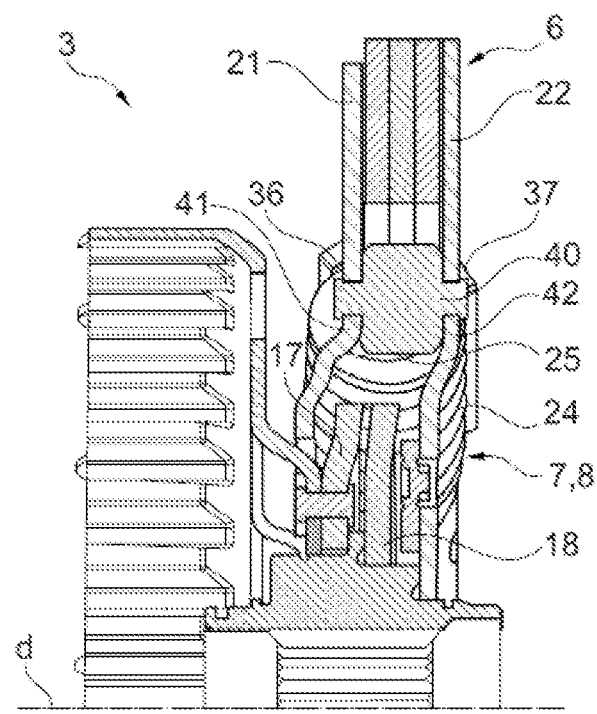
FIG. 4 shows the upper part of the torsional vibration damper from FIGS. 2 and 3 along a modified section line.

FIG. 4 shows the upper part of the torsional vibration damper 3 of FIGS. 2 and 3, which is arranged so as to be rotatable about the rotational axis d, along a line of intersection between the spring devices 7, 8. In addition to the spacer bolts 19 (FIG. 2), the two lateral parts 21, 22 are connected to further spacer bolts 40 at the radial height of the spring devices 7, 8. The spacer bolts 40 with the disc parts 17, 18 form stops of the intermediate flange 6 in the circumferential direction to delimit the angle of rotation in order to keep the helical compression springs 24, 25 and the helical compression springs 32, 33 (FIG. 3) alternating with them over the circumference from a block position. The walls 41, 42 of the spring windows 36, 37 load the helical compression springs 24, 25, 32, 33 (FIGS. 2 and 3) in each case with respect to the intermediate flange 6.

Figure 5:
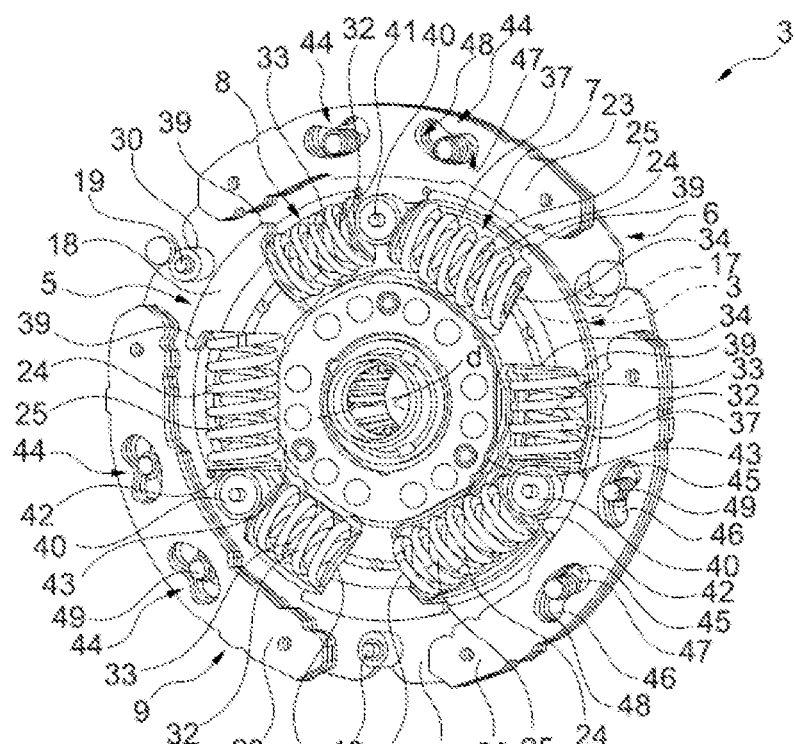
FIG. 5 shows a view of the torsional vibration damper from FIGS. 2 to 4 from the perspective of the converter bridging clutch with the front lateral part removed.

FIG. 5 shows the torsional vibration damper 3 of FIGS. 2 to 4 in a view with the lateral part 21 (FIG. 2) of the intermediate flange 6 removed. The two spring devices 7, 8 are arranged alternately over the circumference and are formed from linear helical compression springs 24, 25, 32, 33 of different spring capacities arranged on the same diameter, so that depending on the direction of the relative rotation, different characteristics are formed when torque is introduced in the pushing or pulling direction. The helical compression springs 24, 25, 32, 33 are each serially loaded by the input part 3 (covered, FIG. 2) designed as a disc part 17, the intermediate flange 6 formed from the lateral parts 21 (FIG. 2), 22 which are axially spaced by means of the spacer bolts 19, 40 and the output part 5 designed as a disc part 18. The helical compression springs 24, 25, 32, 33 are each housed as helical compression spring assemblies in the spring windows 37 of the lateral part 22 and the lateral part (not shown) and loaded by the walls 42 of the same and the loading regions 34 of the disc part 18 with the supports 39 overlapping the helical compression springs 24, 32 in the circumferential direction and in a non-visible manner by the loading regions of the other disc part in the circumferential direction. The disc parts 17, 18 have corresponding recesses 43 which each receive helical compression springs 24, 25, 32, 33 of both spring devices 7, 8.

Radially outside of the spring devices 7, 8, the pendulum masses 23 of the centrifugal pendulum 9 are received in a pendulous manner by means of the pendulum bearings 44 on the intermediate flange 6. For this purpose, recesses 45, 46 with mutually complementary raceways 47, 48 are provided in the pendulum masses 23 and in the lateral parts 21, 22, wherein a pendulum roller 49 axially overlaps the recesses 45, 46 and rolls on the raceways 47, 48. The stop buffers 30 of the spacer bolts 19 serve as elastic stops for the pendulum masses 23 to delimit their oscillation angle.

Figure 6:
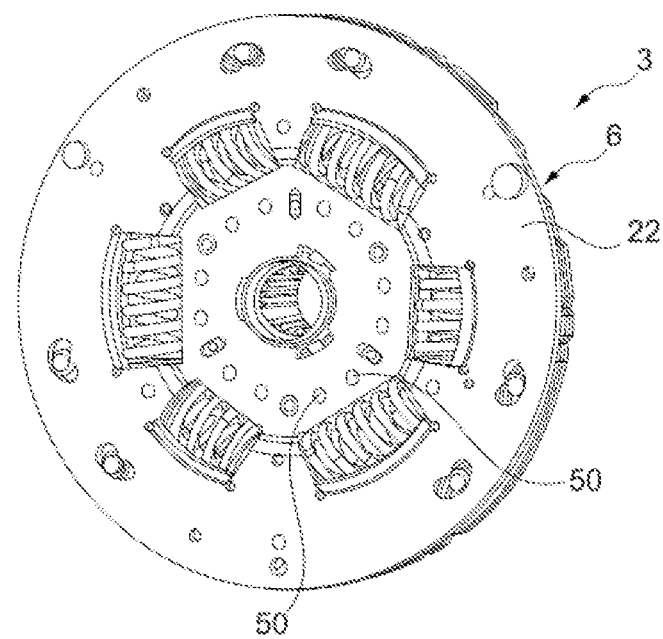
FIG. 6 shows a view of the torsional vibration damper of FIGS. 2 to 5 from the perspective of the turbine wheel.

FIG. 6 shows the torsional vibration damper 3 of FIGS. 2 to 5 in a view from the direction of the turbine wheel 12 of the hydrodynamic torque converter 1 in accordance with FIG. 1. The lateral part 22 of the intermediate flange 6 has the fastening openings 50 distributed over the circumference for receiving the turbine wheel 12, for example by riveting.

Figure 7:
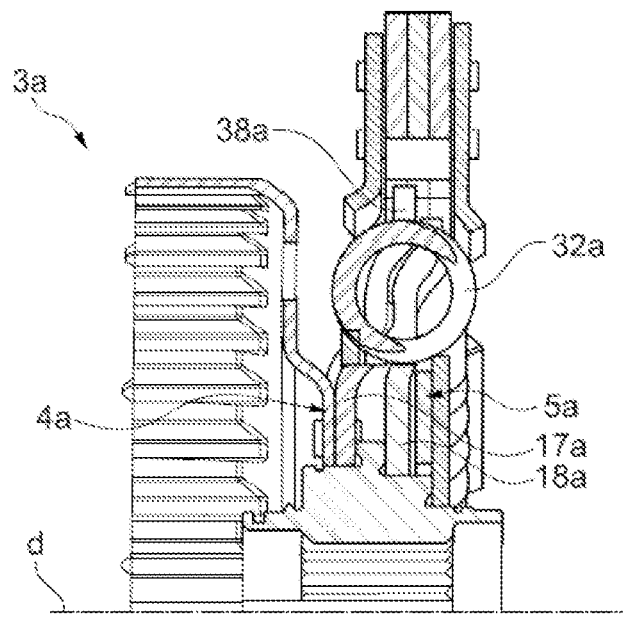
FIG. 7 shows the upper part of a torsional vibration damper modified compared to the torsional vibration damper of FIGS. 2 to 6 in section.

FIG. 7 shows the upper part of the torsional vibration damper 3a, which can be rotated about the rotational axis d, in section. In contrast to the torsional vibration damper 3 of FIGS. 2 to 6, the disc part 18a designed as output part 5a is shortened radially on the outside, so that only the disc part 17a designed as input part 4a has supports 38a extending over the helical compression springs 32a in the circumferential direction.

Figure 8:
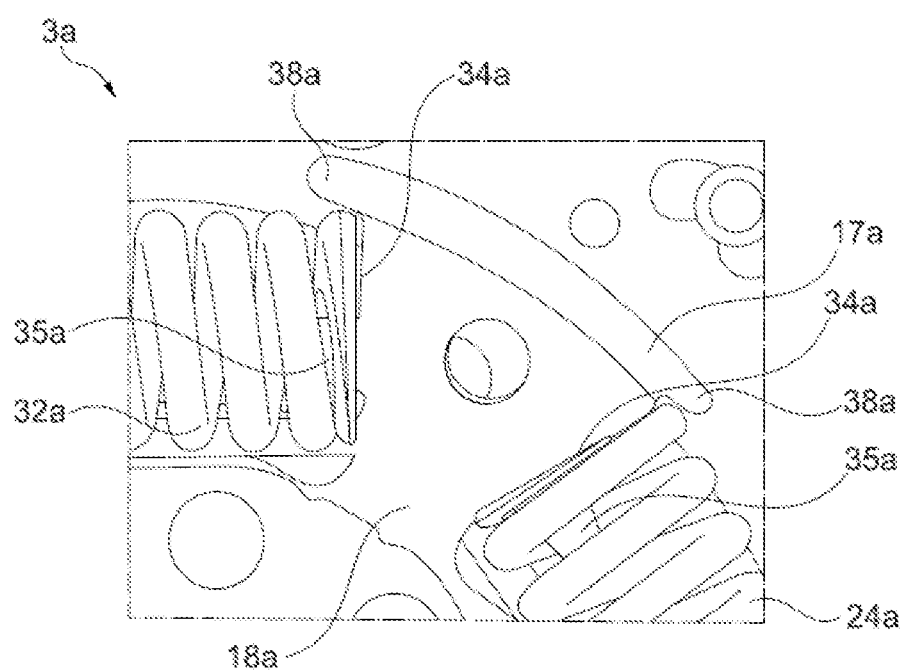
FIG. 8 shows a detail of the torsional vibration damper from FIG. 7 in view.

FIG. 8 shows a detail of the torsional vibration damper 3a of FIG. 7 in the region where the helical compression springs 24a, 32a are loaded. The loading region 34a of the disc part 18a has the nose 35a engaging in the interior of the helical compression springs 24a, 32a and therefore centers the cross section of the helical compression springs 24a, 32a on the loading region 34a radially within the support 38a, which is provided by the disc part 17a.

Figure 9:
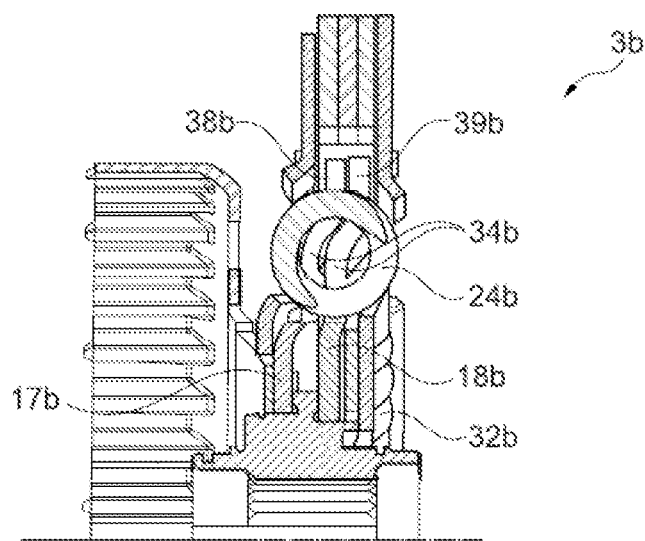
FIG. 9 shows the upper part of a torsional vibration damper modified compared to the torsional vibration damper of FIGS. 2 to 8 in section.

FIG. 9 shows the upper part of the torsional vibration damper 3b modified compared to the torsional vibration dampers 3, 3a of FIGS. 2 to 8, in section. In contrast to the torsional vibration dampers 3, 3a, no nose centering the helical compression springs 24b, 32b is provided on the loading regions 34b of the disc parts 17b, 18b; the loading regions 34b are planar. The disc parts 17b, 18b each have supports 38b, 39b that overlap the end turns of the helical compression springs 24b, 32b radially on the outside in the circumferential direction for radial support thereof.

Figure 10:
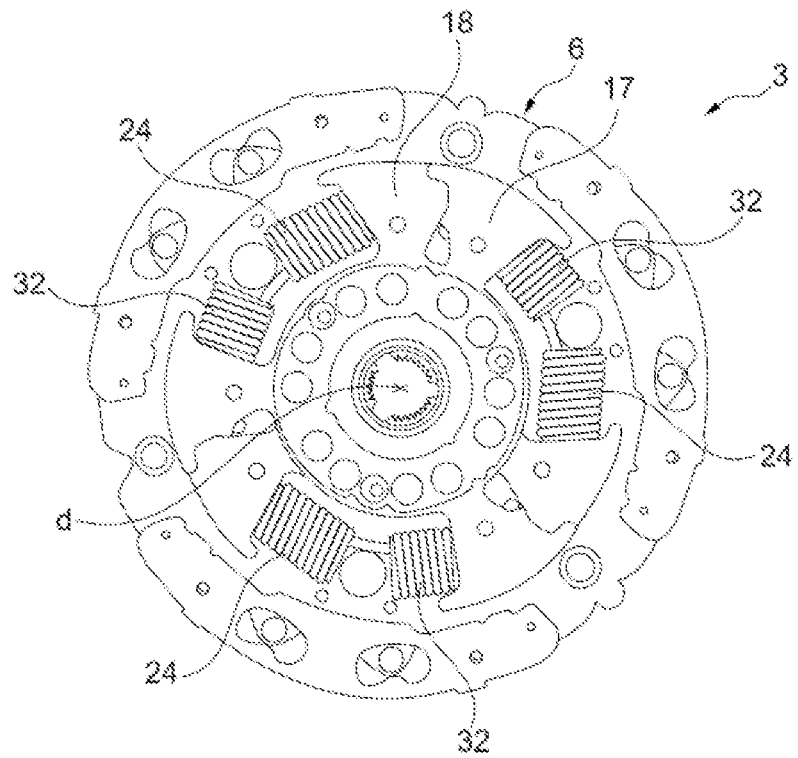
FIG. 10 shows a view of the torsional vibration damper of FIGS. 2 to 6, twisted under tensile load, with the upper lateral part removed.

FIG. 10 shows the torsional vibration damper 3 of FIGS. 2 to 6 under maximum tensile load in a view with the front lateral part 21 removed (FIG. 2). Both spring devices 7, 8 with the outer helical compression springs 24, 32 that slide to the block and therefore obstruct the view of the inner helical compression springs 25, 33 (FIGS. 2 and 3) are maximally compressed. The disc parts 17, 18 are rotated against each other maximally about the rotational axis d, so that one end face of the helical compression springs 24, 32 of the disc parts 17, 18 is pretensioned against the intermediate flange 6 formed from the lateral parts 21, 22.

List of reference numbers
1 Hydrodynamic torque converter
2 Housing
3 Torsional vibration damper
3a Torsional vibration damper
3b Torsional vibration damper
4 Input part
4a Input part
5 Output part
5a Output part
6 Intermediate flange
7 Spring device
8 Spring device
9 Centrifugal pendulum
10 Converter bridging clutch
11 Pump wheel
12 Turbine wheel
13 Output hub
14 Transmission input shaft
15 Plate carrier
16 Rivet
17 Disc part
17a Disc part
17b Disc part
18 Disc part
18a Disc part
18b Disc part
19 Spacer bolt
20 Pendulum mass carrier
21 Lateral part
22 Lateral part
23 Pendulum mass
24 Helical compression spring
24a Helical compression spring
24b Helical compression spring
25 Helical compression spring
26 Thrust washer
27 Locking ring
28 Annular rim
29 Securing ring
30 Stop buffer
31 Balancing weight
32 Helical compression spring
32a Helical compression spring
32b Helical compression spring
33 Helical compression spring
34 Loading region
34a Loading region
34b Loading region
35 Nose
35a Nose
36 Spring window
37 Spring window
38 Support
38a Support
38b Support
39 Support
39b Support
40 Spacer bolt
41 Wall
42 Wall
43 Recess
44 Pendulum bearing
45 Recess
46 Recess
47 Raceway
48 Raceway
49 Pendulum roller
50 Fastening opening
d Rotational axis

The invention claimed is:

1. A hydrodynamic torque converter comprising a pump wheel connected on a drive side and a turbine wheel driven by the pump wheel, wherein, between a housing of the torque converter and an output hub, a torsional vibration damper which comprises an input part that can be connected to the housing by a converter bridging clutch and an output part which is connected to the output hub are provided, wherein an intermediate flange is provided between the input part and the output part, arranged against respective spring devices which act in a circumferential direction, wherein said intermediate flange has a centrifugal pendulum and is connected to the turbine wheel, wherein the input part and the output part are formed as disc parts which are formed axially adjacently, wherein the input part is centered on the output hub and the output part is connected to the output hub in a non-rotatable manner, wherein the disc part of the output part is axially fixed between an annular rim of the output hub and a securing ring.

2. The hydrodynamic torque converter according to claim 1, wherein the spring devices are each formed from linearly designed helical compression springs distributed in the circumferential direction.

3. The hydrodynamic torque converter according to claim 2, wherein the helical compression springs of the spring devices are arranged on substantially the same diameter and alternately in the circumferential direction.

4. The hydrodynamic torque converter according to claim 2, wherein the disc parts have loading regions, arranged in one plane, for end faces of the helical compression springs and the helical compression springs are received in spring windows of the lateral parts of the intermediate flange with loading regions.

5. The hydrodynamic torque converter according to claim 4, wherein the loading regions of the input part and the output part are arranged radially one above the other.

6. The hydrodynamic torque converter according to claim 4, wherein at least one loading region of the input part or of the output part has a nose engaging in an interior of a helical compression spring.

7. The hydrodynamic torque converter according to claim 2, wherein the disc parts have radially outwardly open recesses for the spring devices, wherein a support extending over the helical compression spring in the circumferential direction has at least one disc part on a radial outside.

8. The hydrodynamic torque converter according to claim 1, wherein the intermediate flange is formed from two axially spaced, interconnected lateral parts, which receive the input part and the output part therebetween.

9. The hydrodynamic torque converter according to claim 1, wherein the disc part of the input part is centered on the output hub and is axially fixed by a further securing ring and the annular rim of the output hub.

10. A torsional vibration damper for a hydrodynamic torque converter, comprising an input part, an output part, an output hub including an annular rim, and an intermediate flange, wherein the input part, intermediate flange and output part are arranged in series by helical compression springs acting in a circumferential direction, wherein the input part and the output part are designed as axially adjacent disc parts, which are arranged between two axially spaced and interconnected lateral parts of the intermediate flange, wherein the disc part of the output part is axially fixed between the annular rim and a first securing ring.

11. The torsional vibration damper according to claim 10, wherein the disc part of the input part is centered on the output hub and axially fixed by a second securing ring and the annular rim.

12. The torsional vibration damper according to claim 11, wherein the first securing ring is connected to one of the lateral parts, and the second securing ring is connected to the output hub.

13. The torsional vibration damper according to claim 10, wherein the disc parts of the input part is axially fixed by the annular rim of the output hub.

14. A torsional vibration damper for a hydrodynamic torque converter, comprising an input part, an output part, an output hub including an annular rim, and an intermediate flange, wherein the input part, intermediate flange and output part are arranged in series by helical compression springs acting in a circumferential direction, wherein the input part and the output part are designed as axially adjacent disc parts, which are arranged between two axially spaced and interconnected lateral parts of the intermediate flange, wherein the annular rim contacts an axial side of the input part and an axial side of the output part.

15. The torsional vibration damper according to claim 14, wherein the annular rim is disposed axially between the input part and the output part.

16. The torsional vibration damper according to claim 14, further comprising a securing ring in contact with an opposite axial side of the output part, the securing ring axially fixing the output part against the annular ring.

17. The torsional vibration damper according to claim 16, wherein the securing ring is connected to one of the lateral parts of the intermediate flange.

18. The torsional vibration damper according to claim 14, further comprising a further securing ring in contact with an opposite axial side of the input part, the further securing ring axially fixing the input part against the annular ring.

19. The torsional vibration damper according to claim 18, wherein the further securing ring is connected to the output hub.

20. The torsional vibration damper according to claim 14, wherein the axial side of the input part and the axial side of the output part face each other.

* * * * *